United States Patent
Rauma et al.

(10) Patent No.: US 9,628,201 B2
(45) Date of Patent: Apr. 18, 2017

(54) METHOD AND ARRANGEMENT FOR ADAPTIVE SIGNAL DETECTION

(75) Inventors: Tapio Rauma, Vtt (FI); Marja Matinmikko, Vtt (FI)

(73) Assignee: Teknologian tutkimuskeskus VTT Oy, Espoo (FI)

(*) Notice: Subject to any disclaimer, the term of this patent is extended or adjusted under 35 U.S.C. 154(b) by 560 days.

(21) Appl. No.: 13/698,667

(22) PCT Filed: May 13, 2011

(86) PCT No.: PCT/FI2011/050442
§ 371 (c)(1),
(2), (4) Date: Dec. 7, 2012

(87) PCT Pub. No.: WO2011/144809
PCT Pub. Date: Nov. 24, 2011

(65) Prior Publication Data
US 2013/0072130 A1 Mar. 21, 2013

(30) Foreign Application Priority Data
May 20, 2010 (FI) .................................. 20105553

(51) Int. Cl.
*H04B 17/00* (2015.01)
*H04W 16/14* (2009.01)
*H04B 17/20* (2015.01)
*H04W 24/08* (2009.01)

(52) U.S. Cl.
CPC ............ *H04B 17/004* (2013.01); *H04B 17/20* (2015.01); *H04W 16/14* (2013.01); *H04W 24/08* (2013.01)

(58) Field of Classification Search
CPC ... H04B 17/0042; H04W 16/14; H04W 24/08
USPC ....................................................... 455/67.11
See application file for complete search history.

(56) References Cited

U.S. PATENT DOCUMENTS

2005/0117630 A1* 6/2005 Kishi .................... H04B 1/7115
375/147
2010/0069013 A1 3/2010 Chaudhri et al.

FOREIGN PATENT DOCUMENTS

| EP | 1944996 | 1/2008 |
|---|---|---|
| WO | WO 2010/022156 | 2/2010 |
| WO | WO 2010/025662 | 3/2010 |

* cited by examiner

Primary Examiner — Eugene Yun
(74) Attorney, Agent, or Firm — Seppo Laine Oy

(57) ABSTRACT

The present invention describes a new distributed decision making scheme for adaptive signal detection. The innovation describes an adaptive system and method for allocating signal detection resources that are used to find out the status of channel use (occupied/unoccupied). The system includes selection of suitable spectrum sensing methods and decision combining techniques as well as the associated parameters to meet the requirements set for the system in the specific operational environment. The result is that the system has good performance, simple implementation and is applicable to versatile time-variant situations.

7 Claims, 4 Drawing Sheets

METHOD AND ARRANGEMENT FOR ADAPTIVE SIGNAL DETECTION

BACKGROUND

Field of Invention

The radio spectrum is divided into spectrum bands that are allocated to different services, such as mobile, fixed, broadcast, fixed satellite and mobile satellite. For mobile services, forecasts of future mobile telecommunication market predict strong growths in the income per user and aggregate data rates in the time span 2010-2020. A fundamental problem facing the future wireless systems is where to find suitable carrier frequencies and bandwidths for operation because all spectrum bands are already allocated to different services.

A solution to the spectrum scarcity problem is to opportunistically use channels that belong to some primary user system without causing harmful interference to the system by using cognitive radio techniques. A pre-requisite for opportunistic spectrum use is reliable detection of the presence of primary user systems so that they can be protected from interference by avoiding such occupied channels.

Cognitive radio techniques are capable of obtaining knowledge of the spectrum use in the surrounding environment with e.g. spectrum sensing techniques. Due to radio wave attenuation and noise, spectrum sensing measurements at one cognitive radio node are not reliable enough as the signals from primary user systems can be attenuated below the detection sensitivity. Cooperative spectrum sensing that collects observations from several nodes and forms the decision on the presence or absence of primary user with some combining rule is needed to guarantee sufficient protection for primary user in the realistic fading environment.

Different techniques are available for spectrum sensing and for combining the sensing results in cooperative sensing. Different techniques require different amount of a priori information, differ in complexity, and their performances are different in different situations and environments.

It is an object of the present invention to provide a reliable and efficient solution to the above mentioned detection problem.

SUMMARY OF THE INVENTION

It is an object of the present invention to provide a system and components which provide reliable decisions on the current spectrum use efficiently in different operational environments, e.g. different spectrum bands, and different configurations, e.g. numbers of cooperative nodes.

It is an aspect of the present invention to use the parameterization of cooperative spectrum sensing, e.g. the selection of suitable cognitive radio nodes for cooperation, suitable sensing and combining techniques and their parameters to meet the requirements of specific situations.

Additionally, a new distributed and adaptive decision making scheme is presented. The distributed decision making scheme consists of upper layer and lower layer functionalities. The upper layer decision making scheme is used for configuring the functionalities of the lower layer (e.g. selection of signal detection algorithms and their parameters) based on the operational environment and other requirements (e.g. performance requirements and operational policies). The lower layer performs actual signal detection by using pure sensing data with the selected algorithms.

Furthermore, a method for signal detection is disclosed in which local observations on spectrum use are made in a distributed fashion in several cognitive radio nodes (terminals or other network components) with selected spectrum sensing techniques (e.g. energy detection, matched filtering, waveform based detection, or feature detection or combinations thereof). Local decisions on channel occupancy are collected by a fusion centre where the measurement data or the decisions are combined with some combining rule (e.g. AND, OR, majority rules) that is suitable for the specific situation.

Numerous advantages will be realized by utilization of the present system and method. For example, the decision maker in the lower layer can be kept simple and stable as all needs for adaptation are carried out by a meta-decision maker in the upper layer. The used cooperative sensing method can be quickly and easily changed by adjusting parameters in the lower layer's algorithm. This minimizes the needs for additional implementations for several methods. Also, components of this arrangement can be installed in, on or by different telecommunication equipment therefore making the decision making truly distributed. Notably, it guarantees good performance in versatile situations (e.g. different spectrum bands) because the best techniques are selected to meet specific requirements.

DETAILED DESCRIPTION OF THE PREFERRED EMBODIMENTS

The present invention aims at creating a system for adaptive allocation of resources for identifying unoccupied channels. In short, the system includes a selection of suitable spectrum sensing methods and the selection of combining techniques to meet the requirements set for the system in the specific operational environment. The requirements may involve for example time-related issues, time used to sense channels versus time needed in transmitting information, or reliability related issues, which method to use to find out spectrum occupancies reliably enough. One aspect of the problem is that it easily turns into optimization problem, where limited time, limited complexity, and required reliability form the cost function together.

Figure 1:
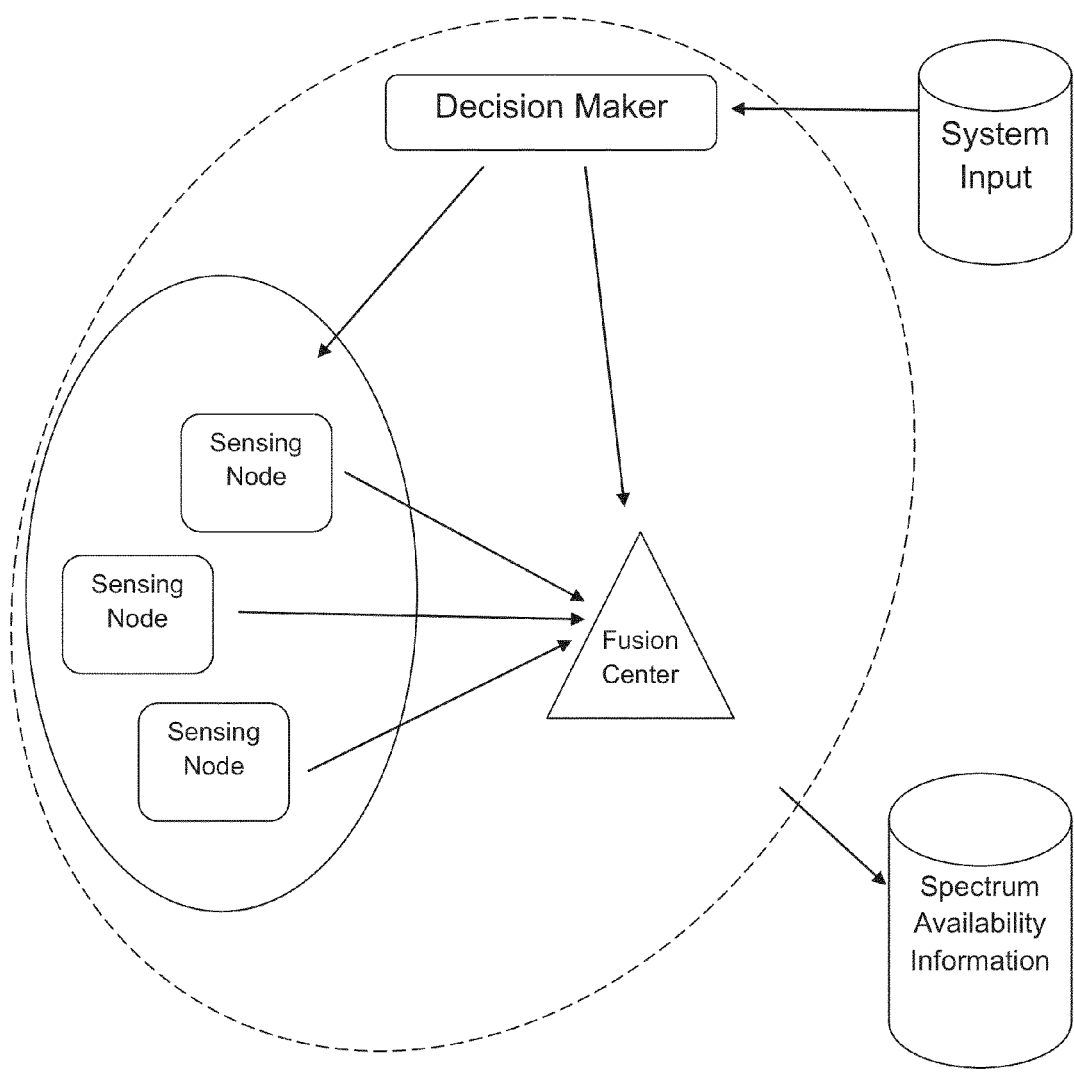
FIG. 1 shows a diagram of the system architecture, inputs and output.

As seen in FIG. 1, the system consists of distributed cognitive radio nodes, one or more fusion centers and a decision maker. The cognitive radio nodes are, for example, handheld terminals, base stations, other network components or specific sensors that are capable of performing signal detection with some algorithms. The algorithms can be related to energy detection, matched filtering, waveform based detection, feature detection or combinations thereof. Local observations on spectrum use (i.e. results of signal detection) are made in a distributed fashion in several cognitive radio nodes. The fusion center as well as the decision maker can also be cognitive radio nodes. Preferably, the pluralities of cognitive radio nodes that make up the system vary in their capabilities and sensor makeup.

However, it is conceivable that a system would exist with uniform cognitive radio nodes distributed in various locations.

Each component, or selected components, performs signal detection and the results include either measurement results, local decisions of signal presence or a combination of the two. Then the signal detection data is sent to a fusion centre, which can be one of the nodes or some other device, which collects the signal detection data from at least one and preferably several other nodes.

The fusion centre performs a joint decision on the presence or absence of the signal with some combining rule (e.g. AND, OR, majority rule, weighted combining) that fuses the observations from the individual nodes. If a primary user signal is declared to be absent, then the system can use the given channel opportunistically without causing harmful interference to the primary user.

Figure 2:
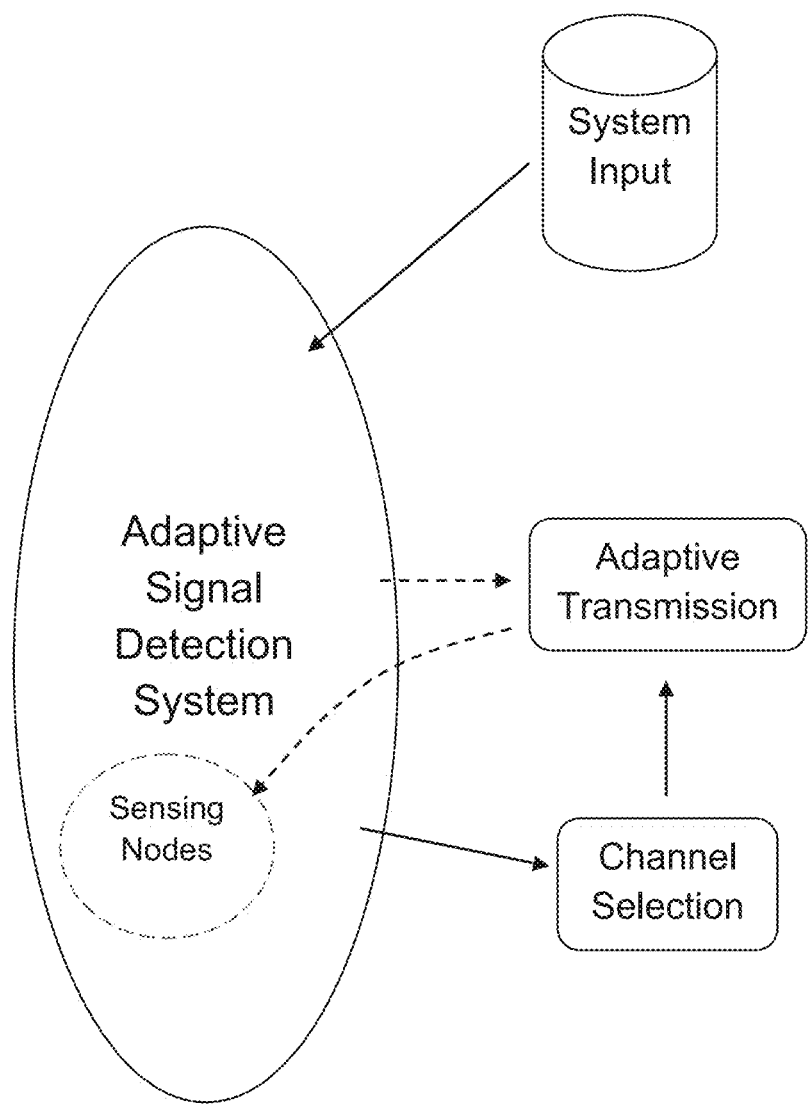
FIG. 2 shows a diagram of the interaction of the system and linked external activities.

FIG. 2 shows that the output of the adaptive signal detection system, spectrum availability information, is used in channel selection and either directly or indirectly in the adaptive opportunistic transmission of data on the available channel(s). Also shown in the figure is that the adaptive transmission can be from the nodes or components that make up the adaptive signal detection system itself.

For an example, an adaptive signal detection system has four nodes, A-D, each of which are comprised of a transmission means and a cognitive radio node. The system inputs indicate that information should travel from node A to node D. Based on the operation of the adaptive signal detection system, which will be explained in more detail below, it is determined that around node A that channel 1 is available, around node B channels 1 and 2 are available, around node C all channels are available and around node D only channel 2 is available.

In traditional operation, the data to be sent from A to D would not be able to be sent at that time since there was no open channel between A and D. However, with the use of the present system, data can be sent from A to either B or C on channel 1, and from there to node D on channel 2. If there were only nodes A and D, then the system would not be able to detect availability, and therefore opportunistically send data, from A to D. The addition of more nodes provides more complete and reliable spectrum availability information.

This can be seen in the example by the fact that at node C there was no usage and therefore little to no possibility of interference at that location.

In operation, there will be tens, hundreds or even thousands of nodes which provide data to the adaptive signal detection system. While the system can be realized with a limited number of nodes, as in the example above, the optimal performance of the system occurs where there are a sufficient number of nodes to provide a reliable picture of the spectrum band usage in the desired region.

The key to the efficiency and reliability of the system therefore is that information from several sensing nodes is used in the process to decide whether the spectrum band is occupied or not and there exist many variations of different methods in sensing and making the joint decision. How the selection of methods for sensing and joint decision making should be done in an efficient way will be explained herein.

The system architecture comprises a two-layer decision making scheme for configuring the signal detection system. The system architecture is shown in FIG. 1. The distributed decision making scheme consists of an upper layer or meta-control block, decision maker, and lower layer or spectrum sensing block functionalities, sensing nodes and fusion center.

The upper layer decision making scheme is used for configuring the functionalities and parameters of the lower layer. For example, selection of signal detection method(s), decision making methods in combining algorithms, and their parameters based on system inputs including requirements and operational environment. System inputs can be input to the decision maker manually via an input means or can be transmitted to the decision maker from a remote device.

The lower layer performs actual signal detection by using selected signal detections and decision making schemes using the parameters chosen by the meta-control block. The upper layer allows easy parameterization for the lower layer that is most suitable for the specific situation. The decisions in the upper layer are done based on solving an optimization problem.

The optimization problem is formed for the given situation to optimize the allocation of signal detection resources to meet the requirements and constraints. The utility function in the optimization problem can be altered based on the specific situation. The results of the spectrum sensing block are stored in the database, and/or they are used immediately in channel selection functionality.

Figure 3:
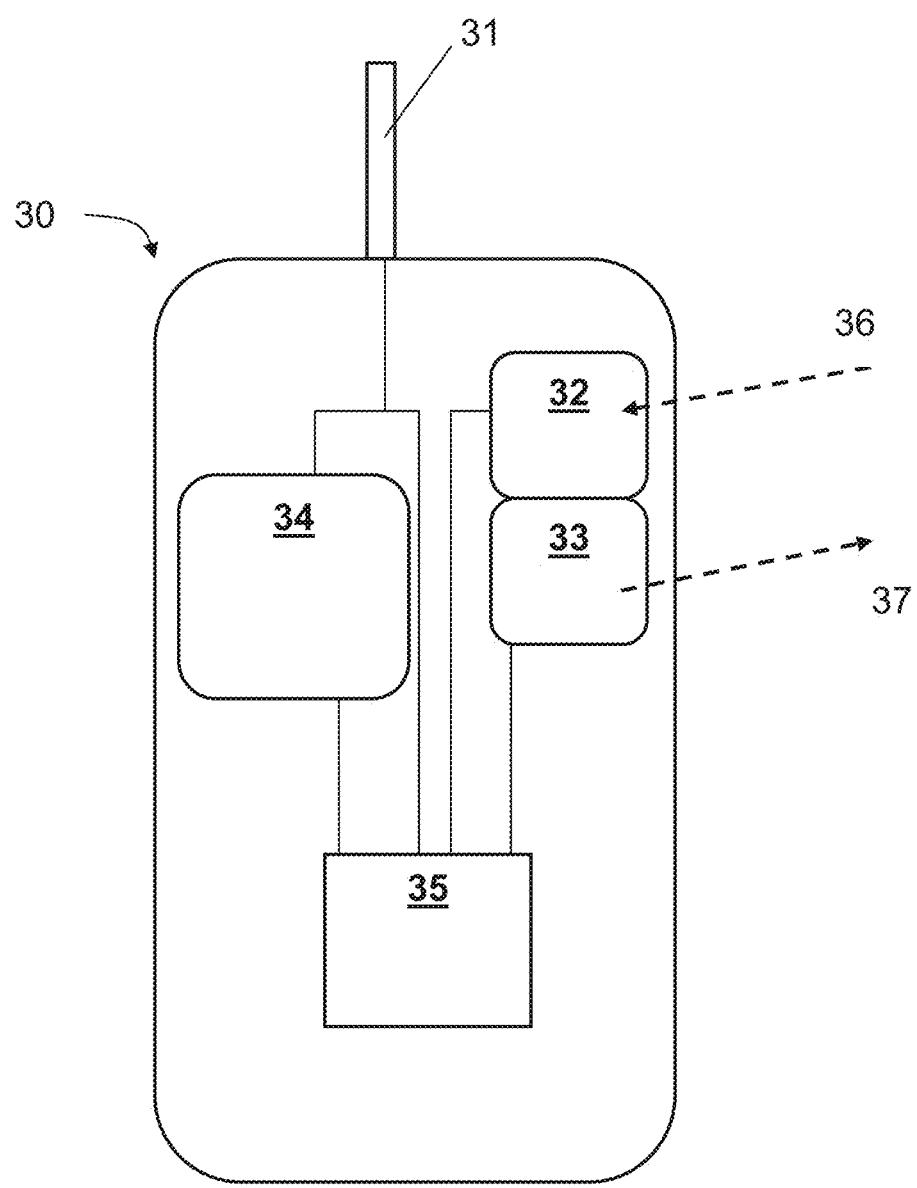
FIG. 3 shows a schematic of a Cognitive radio node, Fusion center and decision maker.

FIG. 3 shows a generic embodiment of a system component 30, i.e. cognitive radio node, fusion center and decision maker. Each system component comprises a controller 35 which can be a processor, CPU or other similar unit which is capable of carrying out the tasks associated with the specific component. In order to keep manufacturing and maintenance costs low, it is not necessary that the controller, especially in the cognitive radio nodes, be much more powerful than necessary to carry out its required tasks. Additionally, it is conceivable that the controller is more than one individual processors or control units.

Connected to the components controller 35 is a receiver 32 which is capable of receiving data or instructions 36 from other system components and devices. Either together or separate from the receiver 32 is a transceiver 33 which is capable of sending data or instructions 37 to other system components and devices. Additionally, the transceiver 33 can be for opportunistic signal transmission or there can be an additional, or plural additional, transceivers for the opportunistic signal transmission integral to the system component or electrically coupled to the system component.

Coupled to the component controller 35 is a memory medium 34. The memory medium 34 can be read-only or read/write for storage of, for example, signal detection schemes, decision combining schemes, instructions, collected data, received data, or solved optimization problems. When a system component is being used as a cognitive radio node then there is a sensor 31 connected to the controller 35 and optionally the memory medium 34. One of ordinary skill in the art will recognize that this is a general embodiment of these components and that a plurality of additional units and architectures can be utilized within or coupled to the components without departing from the scope of the present disclosure.

Typically, the decision maker makes up the upper layer of the decision making system and the cognitive radio nodes combined with the fusion center make up the lower level of the decision making system.

The upper layer decision making system forms the decision making strategy for the lower layer and controls the lower layer to acts according to the strategy. The outputs from the upper layer can include e.g. the following:

selection of cognitive radio nodes for performing cooperative spectrum sensing (How many nodes should do the signal detection? Which of the available nodes are selected to do signal detection?)

selection of fusion center for collecting and combining of sensing results (fusion center can be one of the nodes or some other network component)

selection of signal detection schemes used at different nodes (e.g. energy detection, feature detection, combined detection with coarse and fine sensing)

selection of decision combining scheme used at the fusion center (e.g. data fusion, decision fusion (AND, OR and majority combining), soft combining, weighted combining)

parameters of the signal detection scheme (e.g. sensing time, number of samples used for detection, sensing start time and end time, threshold)

parameters of the decision combining schemes (e.g. number of nodes for combining threshold, weights for weighted combining)

selection of control scheme (How sensing results are collected to the fusion center from different nodes (e.g. sequential polling of each node, common request to all? How do the nodes sent the control data?)

selection of frequency channels and bandwidths to be sensed selection of optimisation criteria (e.g. maximize throughput, maximize probability of detection, minimize sensing overhead, minimize sensing time) and constraints for performing the sensing resource allocation (e.g. requirement for probability of detection, number of available nodes, regulatory constraints).

The upper layer takes as input information on e.g. policies and operational environment. Policies can include e.g. performance requirements (e.g. signal detection probability, timing limits, reliability requirements) set by the spectrum regulatory authority to allow opportunistic spectrum use on the specific band. Environment information can include e.g. information on propagation conditions or information of the waveforms of the other systems that are present on the specific spectrum band. In particular, input information on the possible primary user systems and their signal types on the specific spectrum band are very beneficial in selecting the best spectrum sensing schemes that can provide the desired performance. Based on input information, some signal detection and decision combining algorithms are more suitable than others to meet the requirements in the specific situation.

Pertaining to the lower layer, there are different algorithms for signal detection, e.g. energy detection, matched filtering, waveform based detection, or feature detection or combinations thereof. It is typical to these algorithms that they have different levels of performance and complexity and thus are more suitable in different operational policies and conditions. In addition, they can operate with different levels of a priori information meaning that some spectrum sensing algorithms require specific information on what are the primary user signal types before it can operate while other algorithms do not require a priori information.

There are also different algorithms for performing the combining of sensing results from several nodes e.g. AND (channel occupied if all nodes declare it occupied), OR (channel occupied if one node declares it occupied), majority (channel occupied if most of the nodes declare it occupied) or weighted combining (local decisions are weighted with different weights based on e.g. their reliability or radio propagation conditions). It is typical to these methods that some are better under different operational policies and conditions. For example, if it is important that the primary users are not missed, OR scheme is the most suitable. If resource use must be made as efficient as possible, other combining schemes (e.g. majority) are more suitable.

The upper layer selects the most suitable signal detection and combining scheme as well as their parameters and communicates this to the lower layer. Unlike in traditional approaches, the adjustment of the combining scheme can be done by adjusting parameters of the existing combining schemes. For example, the combining techniques can be implemented using fuzzy logic. The change between the different combining techniques (e.g. ANR, OR and majority) can be done by simple changing of the parameters of the fuzzy decision making block (e.g. locations of membership functions). The implementation technique for decision makers may be fuzzy logic. Similar kinds of architectural solutions are published by fuzzy logic experts.

Figure 4:
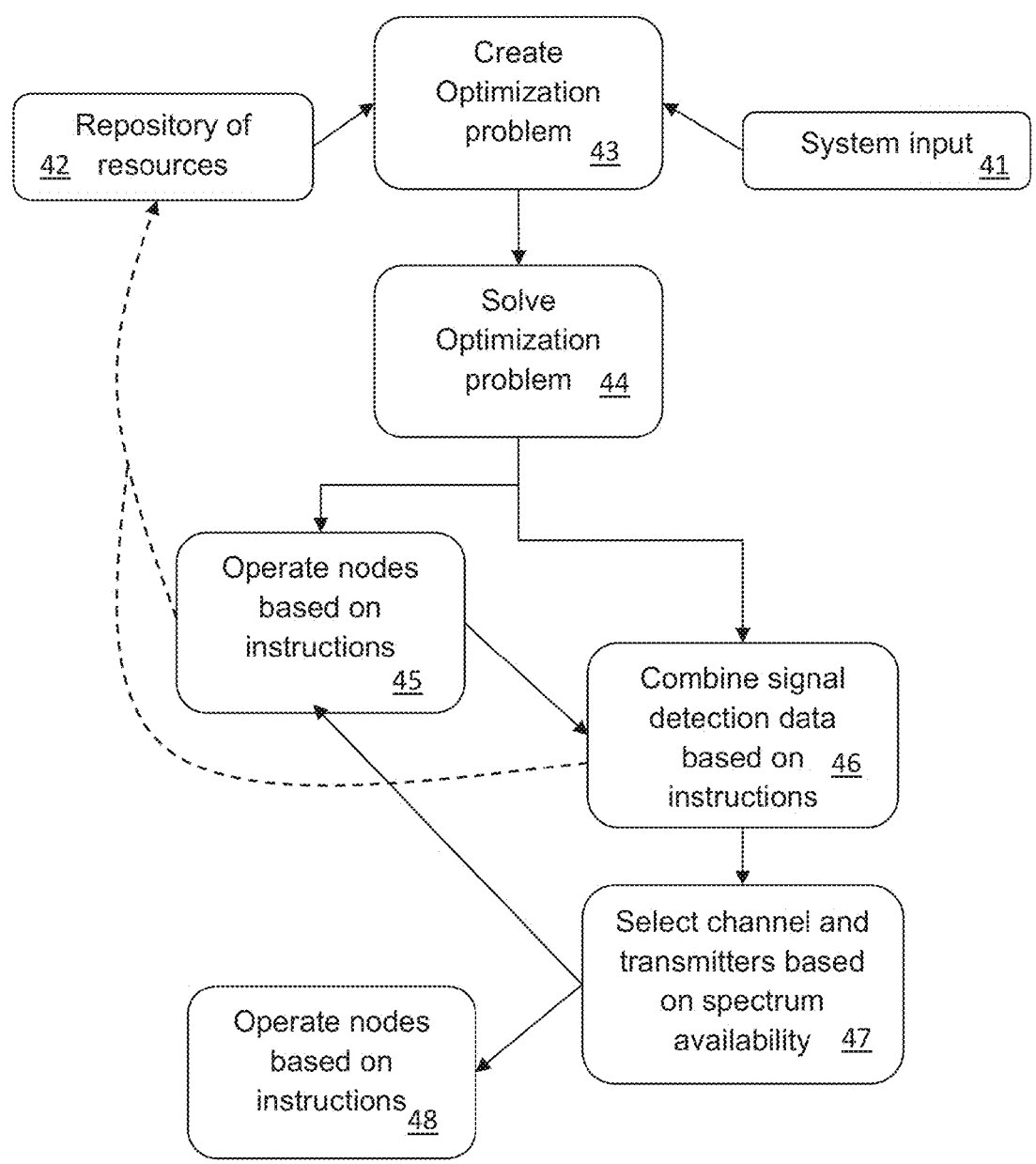
FIG. 4 shows a block diagram of the method according to an embodiment of the present invention.

FIG. 4 shows one embodiment of a method used in an adaptive signal detection system. The heart of the method is the creation of an optimization problem 43 typically in the decision maker. The optimization problem 43 is formed in part by the system inputs 41 which include the policies, operational environment constraints as described above as well as any other necessary information. In addition to the system inputs 41 the optimization problem uses information from a repository of resources 42. This repository can be a database stored in the memory medium of the decision maker, or other suitable location, which contains all of the available resources that can be part of the solution to the optimization problem. Additionally, the repository can contain information about currently unavailable resources, such as nodes currently being used, along with information about when they will become available resources.

Once the optimization problem is formed then it is solved 44 which create a set of instructions to be carried out by various system components. The two main portions of the instructions are the specific instructions to each cognitive radio node to be employed and instructions to the specific fusion centers, if there are multiple fusion centers, which what combining scheme they are to use once they receive data from the cognitive radio nodes.

Each employed cognitive radio node operates based on the instructions in set 45. The instructions direct the cognitive radio node as to which signal detection scheme to employ, what parameters to utilize in the selected signal detection scheme, if any, and what data (measurement data, local availability data or combination) to send to what fusion center, if there are multiple. Instructions to the fusion center can be sent simultaneously with the instructions to the cognitive radio nodes or it can be sent at a separate time.

Once the fusion center has received instructions from the optimization problem solution, as well as the signal detection data from the cognitive radio nodes it combines the signal detection data based on the instruction 46 which results in spectrum availability information. This information can then be used to select channel and transmitters 47 for opportunistic transmission. The transmitters chosen in step 47 can be the nodes utilized in carrying out the optimization problem solution step 45, unutilized nodes within the adaptive signal detection system or transmission nodes outside of the system entirely.

One of ordinary skill in the art will recognize the breadth of the scope of the present invention. Specifically, the present invention is concerned with the accurate, reliable and efficient formation of spectrum availability information. However, the system can be used for the formation of other relevant information and data in wireless data transmission/reception. Additionally, while the primary disclosed use of the spectrum availability information is for utilization with opportunistic signal transmission, it will be readily apparent to one of ordinary skill in the art that there are other uses of that information and the other information obtainable through the system.

The invention claimed is:

1. A cognitive radio node in an adaptive signal detection system, the cognitive radio node comprising;
    a receiver for receiving instructions from a remote decision maker,
    a transceiver for sending signal detection data to a remote fusion center, and
    at least one signal detection sensor,
    more than one signal detection schemes, each signal detection scheme having at least one measurement parameter, and
    a controller configured to, based on instructions received from the remote decision maker, select one signal detection scheme, set at least one measurement parameter of the selected signal detection scheme, and operate the signal detection scheme with the set measurement parameter to obtain signal detection data indicative of the status of a desired signal channel range.

2. A cognitive radio node in accordance with claim 1, wherein one or more of the signal detection schemes are algorithms which utilize selected output of one or more of the at least one signal detection sensors and are stored in a storage medium of the cognitive radio node accessible by the controller.

3. A cognitive radio node in accordance with claim 1, wherein the desired signal channel range of the signal detection data is indicated in the received instructions and is a single frequency channel, a set of dispersed frequency channels, a portion of a spectrum band or one or more entire spectrum bands.

4. A cognitive radio node in accordance with claim 1, wherein the node is a handheld terminal, a base station, a network component or a specific sensor.

5. A method for operating a cognitive radio node comprising the method steps of;
    receiving instructions from a remote decision maker,
    sending signal detection data to a remote fusion center,
    based on the instructions received from the remote decision maker, selecting a signal detection scheme from a group consisting more than one signal detection schemes, each signal detection scheme having at least one measurement parameter,
    setting the at least one measurement parameter of the selected signal detection scheme, and
    operating the signal detection scheme with the set measurement parameter to obtain signal detection data indicative of the status of a desired signal channel range.

6. The method of claim 5 wherein one or more of the signal detection schemes are algorithms which utilize selected output of one or more signal detection sensors.

7. The method of claim 5 wherein the desired signal channel range of the signal detection data is indicated in the received instructions and is a single frequency channel, a set of dispersed frequency channels, a portion of a spectrum band or one or more entire spectrum bands.

* * * * *